United States Patent [19]
Box

[11] Patent Number: 5,847,285
[45] Date of Patent: Dec. 8, 1998

[54] VOLUME COMPENSATING PRESSURE REGULATED FLOW CONTROL DISPENSING SYSTEM

[76] Inventor: Gary W. Box, 1350 Boone Ave. No., Golden Valley, Minn. 55427

[21] Appl. No.: 716,917

[22] Filed: Sep. 20, 1996

Related U.S. Application Data

[60] Provisional application No. 60/004,204 Sep. 22, 1995.
[51] Int. Cl.[6] ............................. G01F 1/74; B67D 5/08
[52] U.S. Cl. ........................................... 73/861; 222/55
[58] Field of Search .................... 73/861, 861.01, 73/861.02; 222/55, 61, 63

[56] References Cited

U.S. PATENT DOCUMENTS

| | | | |
|---|---|---|---|
| 4,018,362 | 4/1977 | Ubaud | 222/55 |
| 4,029,094 | 6/1977 | Winicki | 222/55 |
| 5,054,650 | 10/1991 | Price | 222/55 |
| 5,540,102 | 7/1996 | Kindrick | 73/861 |

Primary Examiner—George M. Dombrooke
Assistant Examiner—Harshad Patel
Attorney, Agent, or Firm—Douglas B. Farrow

[57] ABSTRACT

The system provides continuous compensation of dispensed volume in a pressure regulated flow control system to compensate for changes in material viscosity and component wear. Two counters are preset with a predetermined value. The first counter is decremented by pulses from a flowmeter on the outlet of the system while the second counter is decremented according to the input command. When the first counter reaches zero, the contents of the second counter are examined and the gain increased or decreased accordingly.

6 Claims, 1 Drawing Sheet

VOLUME COMPENSATING PRESSURE REGULATED FLOW CONTROL DISPENSING SYSTEM

RELATED APPLICATIONS

This application is a continuation-in-part of U.S. patent application Ser. No. 60/004,204, filed Sep. 22, 1995.

BACKGROUND OF THE INVENTION

Pressure regulated flow control dispensing systems have been in use for many years. Such systems though are known to become less accurate when either system components wear or the material itself changes in viscosity or otherwise.

Traditionally, such systems are used on a robot which might apply, for example, a bead of adhesive around a windshield. To the extent that such correction has been carried out in the past, it has been on the basis of one cycle of the robot, for example, one complete bead dispensed around a windshield.

SUMMARY OF THE INVENTION

Because conditions can change more rapidly than that, it is therefore an object of this invention to provide a system which provides automatic volume compensation on a real time basis to compensate for such system changes.

It is further an object of this invention to provide a system which may be easily implemented and which utilizes hardware which is already in place in the basic system.

The invention consists of adding a fluid flowmeter such as a gear meter and a gain block which multiplies the set point of the controller by a factor K. The gain block and other data handling functions are implemented as software on the attendant controller.

The compensation sequence starts by setting two counters with fixed values. The first counter is decremented at each pulse from the flowmeter while a second counter is also decremented at periodic intervals by an amount proportional to the set point command from other equipment (such as a robot controller). This serves to integrate the flow command and calculate the desired amount of flow from that flow command.

When the first counter reaches zero, indicating that the preset fixed amount has been dispensed, the contents of the second counter are compared to zero. If the contents of the second counter is greater than zero, the gain is increased by a small fixed amount. If the contents of the second counter are less than zero, the gain is decreased by the same small fixed amount. Both counters are reset and the process repeated.

The gain factor K starts off at a value of 1 and is allowed to fluctuate between minimum and maximum values (for example 0.5 to 1.5). The sample volume is set sufficiently small to force several adjustments over the course of a total dispense cycle (such as the aforementioned windshield). No operator input is required for operation of this compensator.

Also by way of example in the preferred embodiment, each counter is initially loaded with 64 counts. The gain K is incremented or decremented in 0.01 increments and if the limits of 0.5 or 1.5 are reached, a warning may be provided to the operator which would suggest that the operator check general operation of the device and consider recalibration.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

FIG. 1 is a block diagram showing the instant invention.

DESCRIPTION OF THE PREFERRED EMBODIMENT

Figure 1:
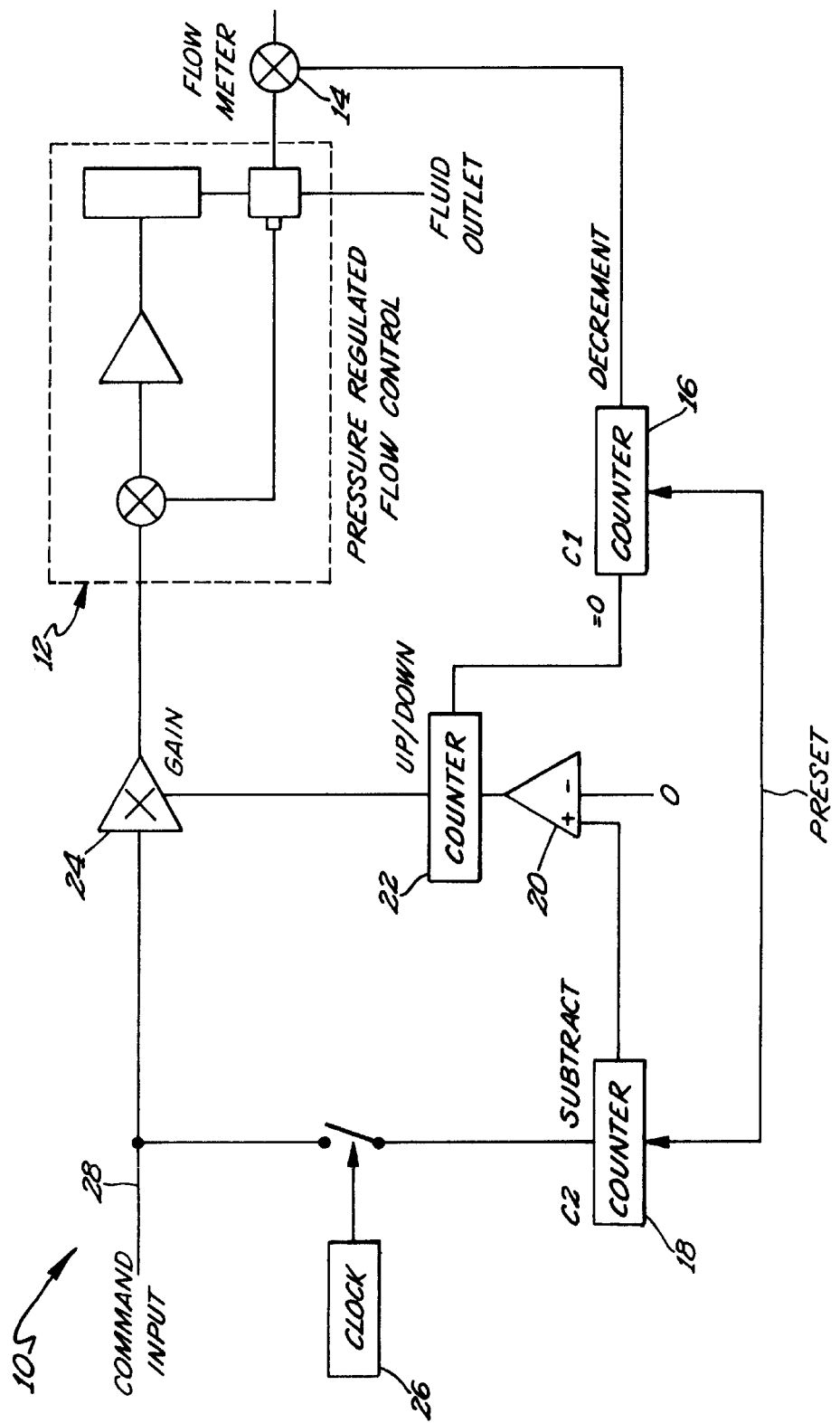

The instant invention, generally designated 10, is designed for use with a typical pressure regulated flow device such as that shown in the dotted outline in block 12. The fluid outlet of that device is provided with a flowmeter 14 which in turn sends pulse signals to first counter 16. For example, the flowmeter might provide an output pulse for each 0.1914 cc of fluid dispensed and which pulse decrements first counter 16.

First counter 16 is set at the same time as second counter 18 which is decremented with an input from command input 28 via clock 26. At the point when first counter 16 reaches zero, comparitor 20 looks at the contents of counter 18. If the contents of counter 18 are greater than zero, the gain in block 24 is increased by a small fixed amount (in the preferred embodiment 0.01) while if the second counter is less than zero, the gain is decreased by the same amount.

The gain in block 24 is allowed a maximum value in the preferred embodiment of 1.5 and a minimum value of 0.5 at which point no further change takes place and an alarm or warning may be made to alert the operator that attention needs to be given the system.

It is contemplated that various changes and modifications may be made to the dispensing system without departing from the spirit and scope of the invention as defined by the following claims.

What is claimed is:

1. A method for compensating for changes in a system for dispensing high viscosity fluids wherein said system comprises an input command, a gain block having a loop gain and a flow meter measuring actual system output and providing an output pulse for each unit of volume dispensed, said method comprising;

providing first and second counters and loading each of said counters with a count corresponding to a predetermined volume;

decrementing said first counter with each pulse from said flow meter;

calculating a flow from said input command;

decrementing said second counter periodically by an amount corresponding to said flow calculated from said input command;

comparing said counters when said first counter reaches zero;

increasing said gain block by a fixed predetermined amount when the contents of said second counter are greater than zero; and decreasing said gain block by a fixed predetermined amount when said second counter contents are less than zero.

2. The method of claim 1 wherein said loop gain has a maximum and a minimum value.

3. The method of claim 2 wherein attainment of one of said maximum and minimum values produces a warning.

4. A method for compensating for changes in a system for dispensing high viscosity fluids wherein said system comprises an input command, a gain block having a loop gain and a flow meter measuring actual system output and providing a signal corresponding to the volume dispensed, said method comprising;

comparing said input command and said volume signal when a predetermined amount of fluid has passed through said flow meter;

increasing said gain block by a fixed predetermined amount when the difference between said input command and said volume signal is greater than zero, said fixed predetermined amount not being proportional to said difference; and decreasing said gain block by a fixed predetermined amount when the difference between said input command and said volume signal is less than zero.

5. The method of claim 4 wherein said loop gain has a maximum and a minimum value.

6. The method of claim 5 wherein attainment of one of said maximum and minimum values produces a warning.

* * * * *